United States Patent [19]

Valyi

[11] 4,040,233

[45] * Aug. 9, 1977

[54] METHOD OF OBTAINING A FILLED, FLUID BARRIER RESISTANT PLASTIC CONTAINER

[76] Inventor: Emery I. Valyi, 5200 Sycamore Ave., Riverdale, N.Y. 10471

[*] Notice: The portion of the term of this patent subsequent to May 11, 1993, has been disclaimed.

[21] Appl. No.: 558,787

[22] Filed: Mar. 17, 1975

Related U.S. Application Data

[63] Continuation-in-part of Ser. No. 538,894, Jan. 6, 1975, Pat. No. 3,955,697, which is a continuation-in-part of Ser. No. 309,346, Nov. 24, 1972, abandoned, which is a continuation-in-part of Ser. No. 71,734, Sept. 14, 1970, Pat. No. 3,717,544, and Ser. No. 100,050, Dec. 21, 1971, Pat. No. 3,719,735.

[51] Int. Cl.² .................. B29C 17/07; B65B 55/06; B65B 55/14
[52] U.S. Cl. .................. 53/21 R; 264/89; 264/90; 264/92; 264/97; 264/234; 425/523; 425/524; 425/526
[58] Field of Search ............ 264/89, 90, 92, 94, 264/96–99, 234, 345; 53/21 R, 167, 191, 194; 425/DIG. 207; 426/401, 407, 412; 215/1 C

[56] References Cited

U.S. PATENT DOCUMENTS

| 3,052,559 | 9/1962 | Peebles | 53/21 R X |
|---|---|---|---|
| 3,058,276 | 10/1962 | Palma | 53/167 |
| 3,342,365 | 9/1967 | Lux et al. | 215/1 C X |
| 3,457,337 | 7/1969 | Turner | 264/98 |
| 3,537,498 | 11/1970 | St. Amand | 426/407 UX |
| 3,561,629 | 2/1971 | Turner | 215/1 C |

Primary Examiner—Jan H. Silbaugh
Attorney, Agent, or Firm—Robert H. Bachman

[57] ABSTRACT

A filled, fluid barrier resistant plastic container is obtained wherein the container is exposed to a temperature in excess of 175° F., as for example being filled with a material maintained at said elevated temperature. A multilayered, hollow plastic container is provided having outer and inner portions of thermoplastic materials resistant to temperatures in excess of 175° F., and a barrier layer of thermoplastic material between the outer and inner portions. The container may be filled with a material at a temperature in excess of 175° F. but below the temperature of resistance of the inner and outer layers whereby the barrier layer softens or melts, and the filled container is cooled to ambient temperature whereby the barrier layer reforms in place to provide the filled, barrier resistant container of the present invention.

10 Claims, 9 Drawing Figures

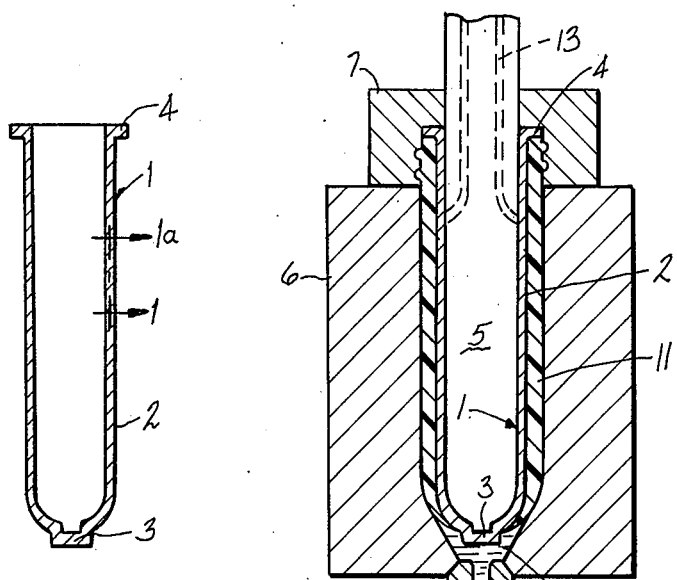
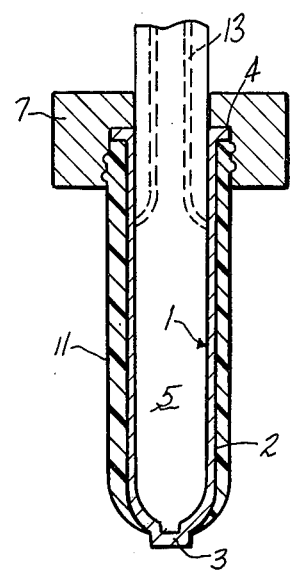
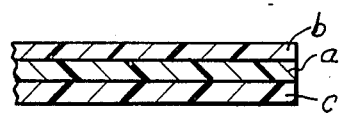
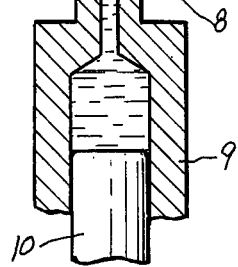
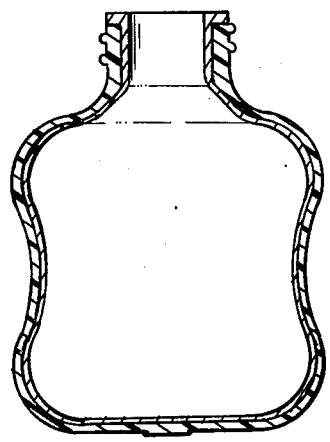
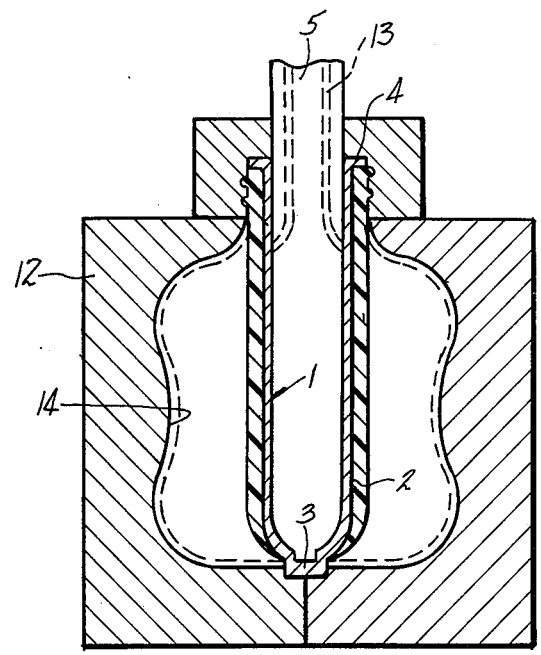
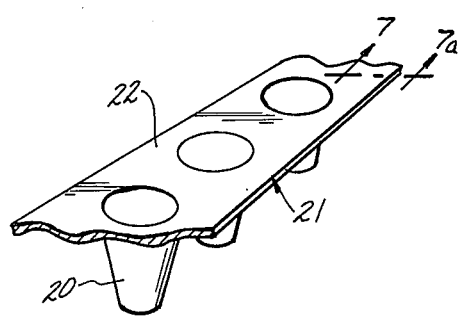

METHOD OF OBTAINING A FILLED, FLUID BARRIER RESISTANT PLASTIC CONTAINER

CROSS REFERENCE TO RELATED APPLICATION

This application is a continuation-in-part of copending application Ser. No. 538,894 for "Multilayered Hollow Plastic Container" by Emery I. Valyi, filed Jan. 6, 1975, now U.S. Pat. No. 3,955,697, which in turn is a continuation-in-part of Ser. No. 309,346 for "Multilayered Hollow Plastic Container" by Emery I. Valyi, filed Nov. 24, 1972, now abandoned, which in turn is a continuation-in-part of Ser. No. 71,734 for "Method and Apparatus for Making Lined Plastic Containers" filed Sept. 14, 1970 by Emery I. Valyi, now U.S. Pat. No. 3,717,544, and copending application Ser. No. 100,050 for "Method for Molding Plastic Containers" filed Dec. 21, 1971 by Emery I. Valyi, now U.S. Pat. No. 3,719,735.

BACKGROUND OF THE INVENTION

This invention relates to the use of multilayered containers having properties which are not obtainable in a single layered product.

Multilayered plastic containers are highly desirable whenever it is difficult to satisfy all of the requirements and specifications by using a single plastic.

For example, the low cost, easy formability, impact resistance and other desirable properties of polystyrene, polyvinyl chloride and polyolefins, especially polyethylene, would make them highly desirable containers for many commodities; however, for example, polyethylene does not have sufficient barrier or solvent resistance for many applications.

In instances of this kind, it has been attempted to provide a lined container, wherein the container wall is composed of more than one substance and thereby provide properties that no single plastic possesses.

However, heretofore the economical production of such containers was prohibitively difficult. In addition, certain combinations of properties presented considerable difficulties even in a composite container.

For example, it is highly desirable to obtain a plastic container having resistance to exposure to elevated temperatures, such as above 175° F. and preferably above 220° F., while at the same time having fluid barrier resistance, such as gas barrier resistance as resistance to the transmission of oxygen and carbon dioxide, or solvent resistance. In such instances, the non-barrier layer of the container may be made of relatively heat resistant plastics, e.g. polypropylene, SAN or polycarbonate. However, the barrier layer or layers, particularly oxygen-barriers, do not have adequate heat resistance. Hence, in containers of this type, it is known that when the container is exposed to elevated temperature conditions, as, for example, when filling with substances at such temperatures, the barrier material tends to melt, destroying the integrity and utility of the container. This particularly significant since for many applications it is desirable to fill containers at elevated temperatures. The viscosity of the material being filled is lower at elevated temperatures, allowing more rapid filling. In addition, sterilization can be provided while or after the container is filled, either by material maintained at an elevated temperature during filling followed by prompt closure of the container preferably in an air tight manner, or by sterilizing in a retort after filling.

Accordingly, it is a principal object of the present invention to provide aa method of obtaining a filled, fluid barrier resistant plastic container.

It is a particular object of the present invention to provide a method as aforesaid wherein the container is filled at temperatures in excess of 175° F., or subsequently exposed to such temperatures, while retaining the barrier resistant characteristics thereof.

Further objects and advantages of the present invention will appear hereinbelow.

SUMMARY OF THE INVENTION

In accordance with the present invention, the foregoing objects and advantages may be readily obtained and a method provided for obtaining a filled, fluid barrier resistant plastic container wherein the container is exposed to a temperature in excess of 175° F., such as during filling, while retaining the barrier resistant characteristics thereof. This permits filling the container with material maintained at an elevated temperature without impairing the barrier resistant characteristics of the container, which is highly desirable, for example, so that the material being placed in the container may have a lower viscosity and/or may be maintained in a sterile condition.

In accordance with the present invention, a multilayered, hollow plastic container is provided having an outer first portion of a thermoplastic material resistant to temperatures in excess of 175° F., an inner second portion of a thermoplastic material resistant to temperatures in excess of 175° F., and a third portion fluid barrier layer of thermoplastic material between the first and second layers. The container is filled with a material maintained at an elevated temperature in excess of 175° F., or subsequently exposed to such temperature, but below the temperature of resistance of the first and second portions whereby the barrier layer softens and perhaps melts upon exposure to said elevated temperature. The filled container is cooled to ambient temperature whereby the barrier layer reforms to retain its barrier resistant characteristics and to provide a filled, barrier resistant container.

The filled container of the present invention achieves a great many highly desirable advantages. Thus, the filled container has resistance to elevated temperatures and also has barrier resistance, particularly fluid barrier resistance, such as gas barrier resistance, which barrier resistance is retained upon repeated exposure to elevated temperature. In addition, as indicated hereinabove, the container may be filled at an elevated temperature without impairing these desirable barrier resistant characteristics.

The principle of the present invention resides in the entrapment of the barrier layer between two layers of heat resistant plastic so that the barrier layer progressively softens, or perhaps melts, upon exposure to elevated temperature and reforms in place upon subsequent cooling to ambient temperatures.

For example, a heat resistant container could be readily formed of material, such as polycarbonate, polypropylene, a phenoxy resin or a polysulfone. Similarly, a barrier plastic liner can be provided in accordance with the aforesaid copending applications utilizing, for example, polyvinylidene chloride, polyvinyl acetate, Barex (an acrylonitrile - styrene copolymer), or Lopak (a methacrylonitrile polymer); however, the barrier materials have softening or melting points well below the temperatures that the containers are called on to resist. This obviously leads to an entirely unsatisfactory situation.

In accordance with the present invention, the liner is prepared from a laminate or sandwich so that in the resultant container the barrier layer is entrapped between two layers of a heat resistant plastic. When the container is exposed to elevated temperatures, the low melting layer entrapped between the heat resistant layers may, and probably will, soften, if not melt, depending of course upon the particular barrier layer and the temperature. However, since the low melting layer is entrapped and in substantial conformity with the adjoining protective layers, it lacks mobility and must remain in place. Thus, upon cooling, the lower melting layer will be restored to its normal condition without change. For example, the lower melting layer cannot shrink and thereby produce voids, tear away, agglomerate or otherwise deform, except as it is forced to by the protective outer layers. Similary, since the lower melting component is a thermoplastic material, is properties will not change upon repeated softening or melting or cooling.

BRIEF DESCRIPTION OF DRAWINGS

The present invention will be more readily understood from a consideration of the accompanying drawings in which:

FIG. 1 is a longitudinal section of a multilayered sleeve adapted to surround a blow core;

FIG. 1a is an exaggerated sectional view taken along the line 1 - 1a of FIG. 1 showing the components of the multilayered sleeve;

FIG. 2 is a longitudinal section with parts in elevation of a parison mold showing the blow core covered by a sleeve;

FIG. 3 is a similar view showing the blow core retracted from the parison mold with the parison thereon;

FIG. 4 is a similar view showing the blow core in blow position within the blow mold and the container of the present invention in the blow mold cavity;

Figure 8:
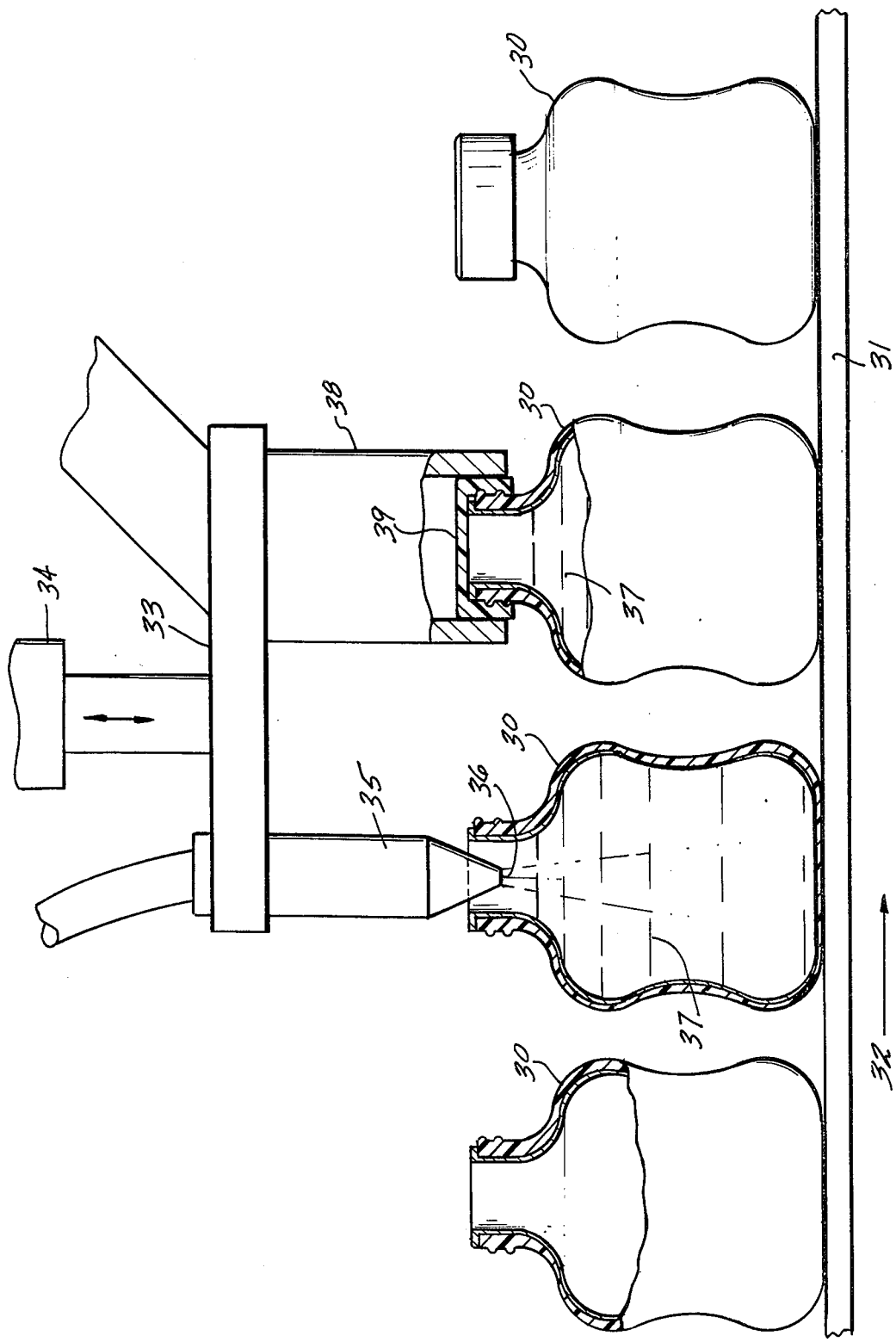

FIG . 5 shows the multilayered, hollow plastic container of the present invention;

FIG. 6 is a partial elevation showing an alternate embodiment of preformed liners;

FIG. 7 is an exaggerated sectional view taken on line 7 - 7a of FIG. 6 showing a multilayered web having two (2) layers; and FIG. 8 is a schematic view of the filling and closing steps of the present invention.

DETAILED DESCRIPTION

Referring to the drawings in detail, FIG. 1 shows a preformed, multilayered sleeve 1 for the blow core to be used in the subsequent molding operation in forming the container of the present invention, said sleeve having an inner surface closely approximating the outer surface of that of the blow core. The thickness of the sleeve may vary depending for example on the materials used and final article desired; thus, side walls 2 may be thin, such as between 0.001 inch and 0.020 inch, while its bottom 3 may be twice to ten times as thick as the side walls and have a shape adapted to provide alignment with the parison mold. The rim 4 of the sleeve may conform to the top region of the container to be made. As indicated hereinabove, such sleeves should be multilayered, as shown in FIG. 1a wherein the central layer a is the barrier layer, such as polyvinylidene chloride, polyvinyl acetate, or acrylonitrile polymers or methacrylonitrile polymers. The outer layers in FIG. 1a, layers b and c, may be any heat resistant plastic, preferably a thermoplastic, such as polycarbonate polypropylene or copolymers thereof. Naturally, the outer layers may be the same or different, as desired. Such sleeves may be produced from a variety of plastics at reasonable cost, by methods well known in the art, such as for example by thermoforming, powder coating, casting, these methods being described on pages 534, 594,and 602,respectively, of the 1969-1970 Modern Plastics Encyclopedia, published by McGraw-Hill, Inc.; and by other methods well known in the art of manufacturing thin-walled, shaped articles of plastic.

The sleeves shown in FIG. 1 are used in a parison mold according to FIG. 2 which consists of blow core 5 and a parison mold 6 and a tool for the forming of the open end of the hollow article, the neck ring 7. A passage 8 connects the parison mold 6 with a supply of hot plastic contained within cylinder 9 from which the molten plastic may be pressed into parison mold 6 by piston 10 under sufficient pressure to effect rapid filling of the space between the blow core 5 and parison mold 6 and the space within neck ring 7 communicating with the parison mold.

The parison 11 molded in the apparatus shown in FIG. 2 may be removed from the parison mold 6 together with the blow core 5 and the neck ring 7, as shown in FIG. 3 and inserted into a blow mold 12. Pressure fluid obtained from a source not shown may be admitted through fluid passages 13 to the interior of parison 11. The blow mold 12 has a mold cavity 14 corresponding to the shape of the hollow article to be made and it may be made of two halves which are separable to facilitate the removal of the finished article to be made therein.

In the operation of this method, sleeves according to FIG. 1 may be produced by any designed method independently of the injection blow molding operation here described. Alternately, sleeves may be fashioned in place, as for example by laminating the plastic layers and wrapping the laminated plastic film stock tightly around the blow core 5. If the parison is to be expanded by blow molding, the sleeve material must have deformation characteristics that equal or exceed those of the parison material, at the temperature normally maintained for expanding the parison into the blow mold cavity 14. Hence, it is preferred that the outer first portion be chosed to be the same plastic material as the inner second portion.

The sleeve 1 which fits snugly over the blow core 5 is placed thereover by hand, or by mechanical means, not shown, before the blow core is inserted into the parison mold 6. When in place within the parison mold, the tip of the blow core, surrounded by bottom 3 of the sleeve may be held firmly against the inner wall of the parison mold, whenever it is desired to stabilize the blow core.

After the blow core is in place, hot plastic is injected into the parison mold through orifice 8 under action of piston 10 operating in pressure cylinder 9. After injection, the hot plastic surrounds the sleeve 1 under pressure. Due to the intimate contact established thereby between the hot plastic and the exposed surface of the sleeve, the sleeve is rapidly heated until its temperature approaches that of the injected plastic. At that temperature, adhesion of the two materials occurs readily and the material of the sleeve is moreover heated throughout sufficiently to render the sleeve deformable at the same rate as the injected plastic. Accordingly, the sleeve unites with the injected plastic and combines with it to form the composite parison 11.

After the formation of the parison by injection the blow core 5 is removed from the parison mold together with the neck ring 7 and with the parison 11 thereon, as shown in FIG. 3. It is next inserted into the blow mold 12, shown in FIG. 4 if a blow molded container is desired.

For accurate location of the blow core 5 in the blow mold 12, the blow core may be pressed against the bottom of the blow mold, with the sleeve botton 3 therebetween. Thus, the blow core is maitained in alignment in the blow mold, the same as it was in the parison mold. As the next step, pressure fluid, usually compressed air, is admitted into the parison through fluid passages 13 and the parison is expanded into the blow mold 12, to assume the shape of the blow mold cavity 14, as indicated by dotted lines FIG. 4. Fluid pressure is maintained until the blown article cools sufficiently in contact with the walls of the blow mold 12, to be removed therefrom.

The multilayered, hollow plastic container of the present invention is shown in FIG. 5 removed from the blow mold.

While the foregoing preferred procedure has been found to achieve a highly advantageous container in a simple and expeditious manner, other methods may also suggest themselves to those skilled in the art for obtaining the container of the present invention.

As indicated hereinabove, the container of the present invention, surprisingly, attains resistance to elevated temperatures and also fluid barrier resistance, such as gas barrier resistance, as resistance to oxygen and carbon dioxide, or solvent resistance.

An alternate embodiment of liners is shown in FIG. 6 wherein cup-shaped liners 20 are carried on web 21 joined by undeformed parts of the web 22. Naturally, the liners 20 are separated prior to use in the process of the present invention. If desired, the liners in this form may be conveniently stacked and fed to the blow core one at a time. As shown in FIG. 7, the liner may comprise simply two layers, with layer $a'$ representing the barrier layer and layer $b'$ representing the heat resistant layer.

The components of the sheet material are as set forth hereinabove. Thus, it is apparent that a variety of materials may be utilized in both the container and sheet material of the present invention. The barrier material may be a fluid barrier material with temperature resistance properties lower than the temperature resistant component or layer, i.e. at least 50° F. lower. Thus, the temperature resistant layer should maintain its structural integrity at the desired temperature, while the barrier layer becomes fluid at said temperature. Hence, one may select any of a variety of temperature resistant layers depending upon the inner layer and desired properties. For example, one may utilize acetal polymers, polycarbonates, phenoxy resins, polysulfones, polyolefins, polyimines, ionomeric resins, and so forth. The outer layers may be different or the same if desired.

FIG. 8 is a schematic view showing the filling and capping of the containers. Naturally, it should be understood that any suitable filling and capping means may be employed and the particular embodiment is intended to be illustrative.

Means is provided for moving a plurality of containers 30 towards and away from the filling station, such as movable table 31 moving intermittently in the direction of arrow 32. A suitable filling and capping means may be provided adjacent the containers, as filling and capping assembly 33 spaced above containers 30 axially movable by means of piston 34 actuated in a known manner so that assembly 33 is movable towards and away from containers 30. The leading portion of assembly 33 may be provided with a suitable filling means, such as filling head 35 having a filling nozzle 36 for insertion into container 30. The filling head 35 is connected to a source of hot material (not shown) and a means may be provided (not shown) for controlling the flow of said material into the container. After the container 30 is filled with hot material 37, piston 34 retracts assembly 33 and the filled container moves to the capping station 38 where caps 39 are secured to the filled containers in a known manner (not shown). Thus, the capping step is performed on a filled container while the previous container is being filled by filling head 35. If sterility of the material is desired, this procedure permits prompt capping of the container. The filled, capped container is then moved by table 31 where it is allowed to cool to ambient temperature and packaged for shipment.

It can be readily seen that the process of the present invention achieves many desirable advantage. Elevated temperature filling may be readily used without destroying the barrier resistant characteristics of the container. This permits more rapid filling and/or maintains sterility of the contents of the container. In fact, the filled container may be subsequently subjected to elevated temperature conditions without danger. In addition, the filled container may be subsequently exposed to elevated temperatures, as, for example, to sterilize the contents of the container, without impairing the barrier resistant qualities of the container.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method for obtaining a filled, fluid barrier resistant plastic container wherein said container is exposed to a temperature in excess of 175° F. while retaining the barrier resistant characteristics thereof which comprises: preparing a seamless, multilayered, hollow plastic container having an open molded neck and having an outer pressure molded first portion of a thermoplastic material resistant to temperatures in excess of 175° F., an inner second portion of a thermoplastic material resistant to temperatures in excess of 175° F., and a third portion fluid barrier layer of a thermoplastic material between said first and second layers and co-extensive therewith throughout the extent thereof, said barrier layer having a lower temperature resistance than said first and second layers so that said container has the property that when exposed to an elevated temperature in excess of 175° F. but below the temperature resistance of said first and second positions said barrier layer softens or melts, but reforms in place upon cooling to retain its barrier resistant characteristics; filling said container through said open neck; exposing said container to an elevated temperature in excess of 175° F. but below the temperature resistance of said first and second portions followed be cooling the container to ambient temperature to utilize said property of the container and provide a filled, barrier resistant container.

2. A method according to claim 1 wherein said container is filled with a material at a temperature in excess of 175° F. and wherein said filled container is cooled to ambient temperature to reform said barrier layer.

3. A method according to claim 2 wherein said second portion is a drawn thermoplastic material.

4. A method according to claim 3 wherein said second and third layers are drawn thermoplastic materials.

5. A method according to claim 2 wherein said first and second portions are resistant to temperature in excess of 220° F. and wherein said container is filled with a material in excess of 220° F.

6. A method according to claim 2 wherein said first and second portions are independently selected from the group consisting of polyolefins, polycarbonates, polysulfones, phenoxy resins, polyimines, ionomeric resins and acetal polymers.

7. A method according to claim 2 wherein said third portion barrier layer is selected from the group consisting of polyvinylidene chloride, polyvinyl acetate, acrylonitrile polymers and methacrylonitrile polymers.

8. A method according to claim 2 wherein said container has a fourth portion of a thermoplastic material resistant to temperatures in excess of 175° F. between said first portion and said third portion.

9. A method according to claim 2 including the step of securing a cap to said open molded neck after said container has been filled with a material at a temperature in excess of 175° F.

10. A method according to claim 1 wherein said container is exposed to an elevated temperature in excess of 175° F. subsequent to filling and wherein the filled container is cooled to ambient temperature to reform said barrier layer.

* * * * *